United States Patent [19]

Olsen et al.

[11] Patent Number: 5,570,861

[45] Date of Patent: Nov. 5, 1996

[54] MUFFLER-TO-CAB ISOLATION MOUNTING ASSEMBLY AND METHOD FOR REDUCING CAB INTERIOR NOISE

[75] Inventors: John N. Olsen, Mt. Vernon, Wash.; David E. Crowe, Krum, Tex.

[73] Assignee: Paccar Inc., Bellevue, Wash.

[21] Appl. No.: 444,555

[22] Filed: May 19, 1995

[51] Int. Cl.$^6$ .................................................. B60K 13/04
[52] U.S. Cl. .................... 248/74.1; 248/74.4; 180/296; 180/89.2; 181/207
[58] Field of Search ............................. 248/62, 65, 74.1, 248/74.4, 316.6; 181/205, 207, 208; 180/89.2, 296, 309

[56] References Cited

U.S. PATENT DOCUMENTS 2,744,706   5/1956   Gerdy ..................................... 248/62 X
4,471,853   9/1984   Callaghan et al. ......................... 80/309

*Primary Examiner*—Robert Canfield
*Attorney, Agent, or Firm*—Flehr, Hohbach, Test, Albritton & Herbert

[57] ABSTRACT

A muffler mounting assembly (20) for mounting an elongated muffler apparatus (21) to a vehicle (22) for vibratory isolation thereof. The mounting assembly (20) includes a mounting bracket (23) formed for mounting to the vehicle (22), and a muffler support bracket (25) supportively contacting a periphery of the muffler apparatus (21). A pair of isolation mounting devices (27, 28) couple the support bracket (25) to an end portion of the mounting bracket (23). Each mounting device (27, 28) is positioned at a location between the support bracket (25) and the mounting bracket (23), and at substantially opposite sides of the muffler longitudinal axis (26). Further, each mounting device (27, 28) is substantially aligned in a plane (30) extending through the center of gravity (CG) of the muffler apparatus (21).

23 Claims, 7 Drawing Sheets

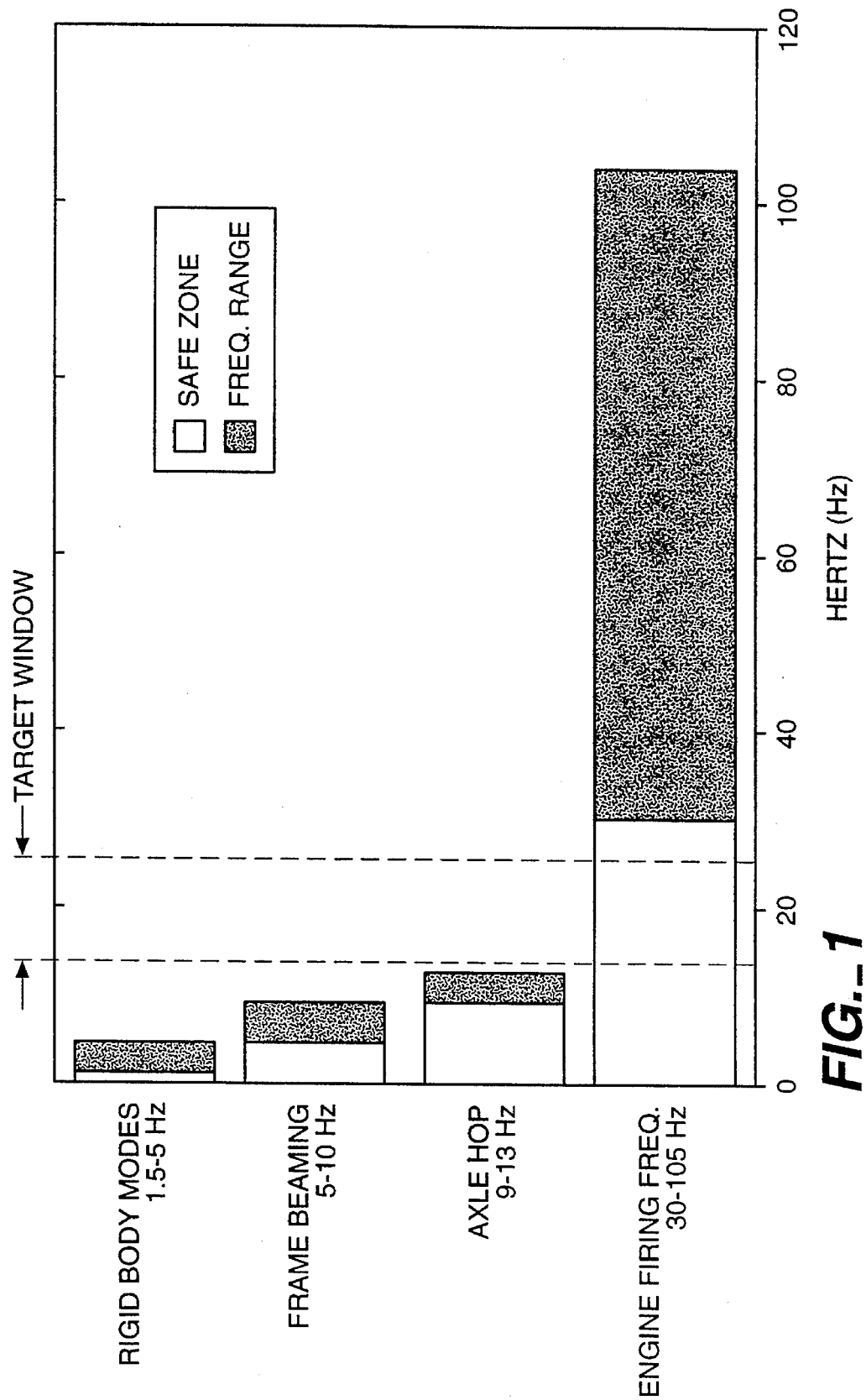
FIG._1

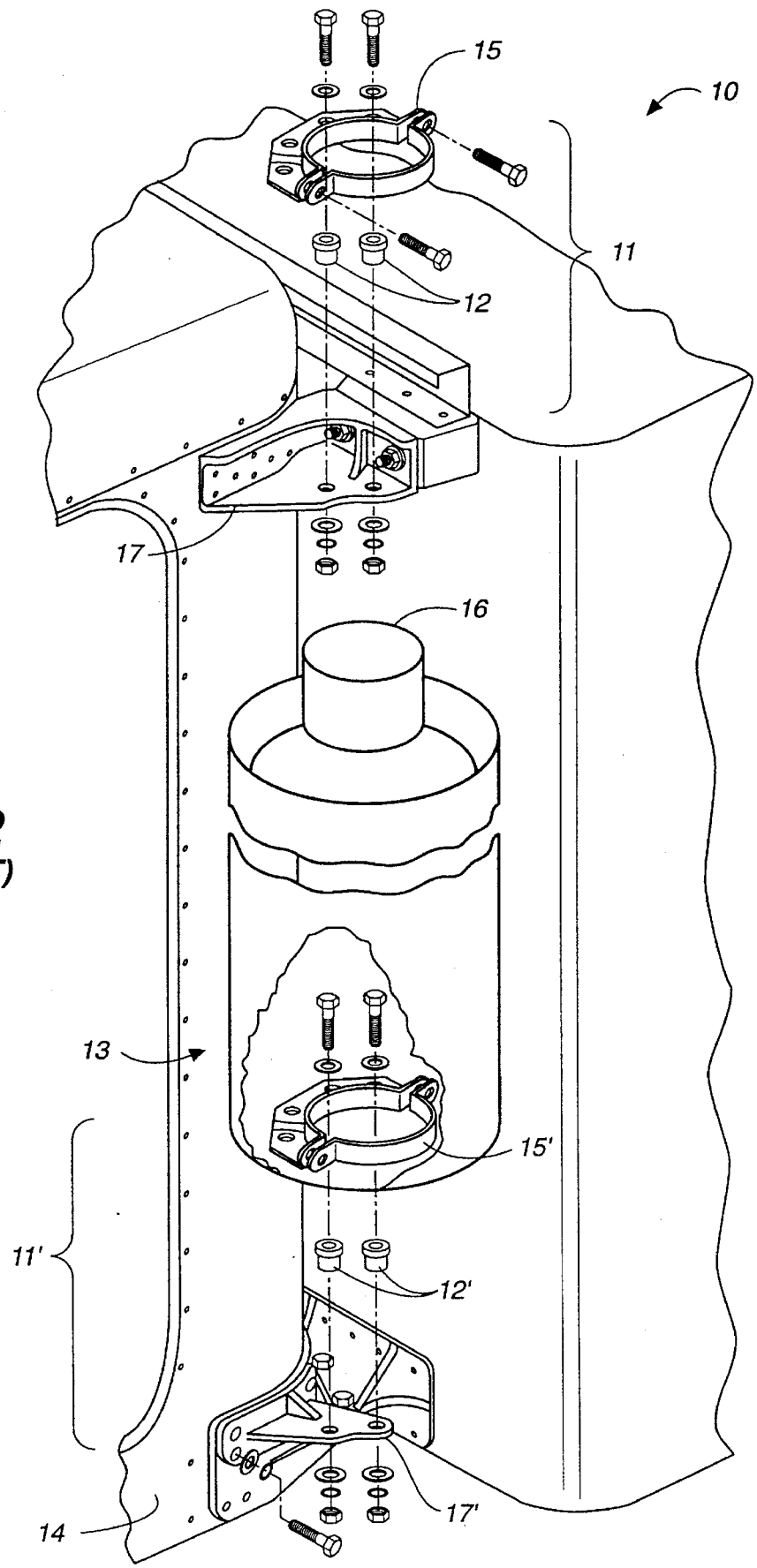
FIG._2
(PRIOR ART)

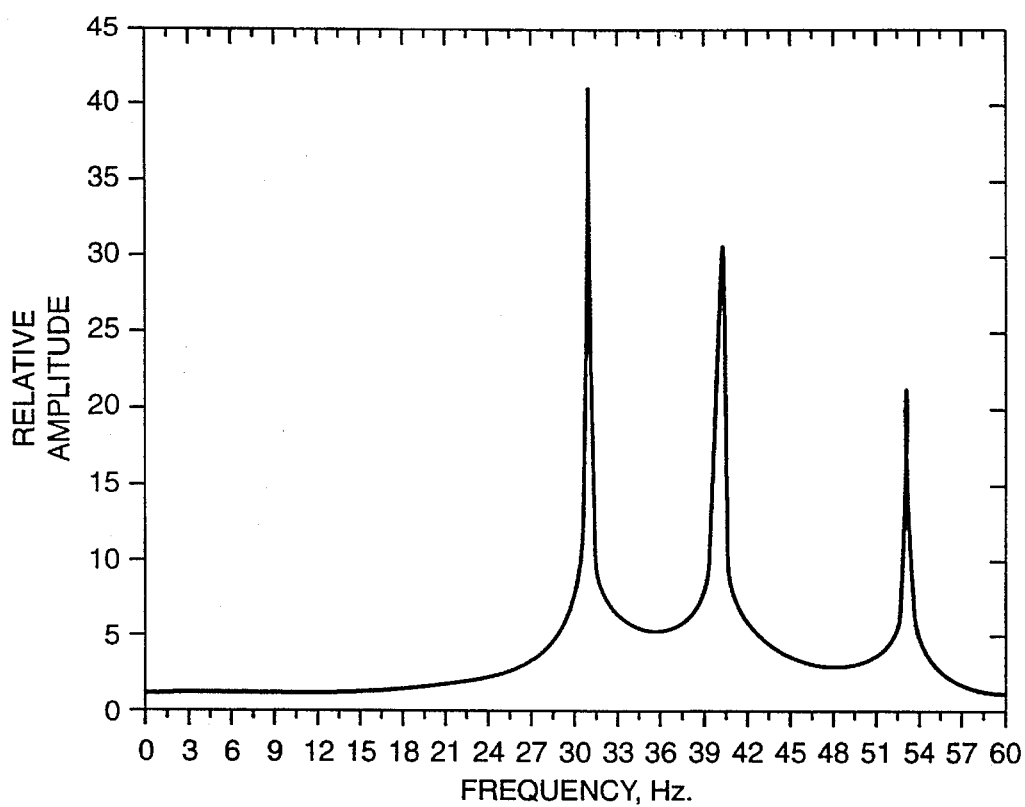
FIG._3
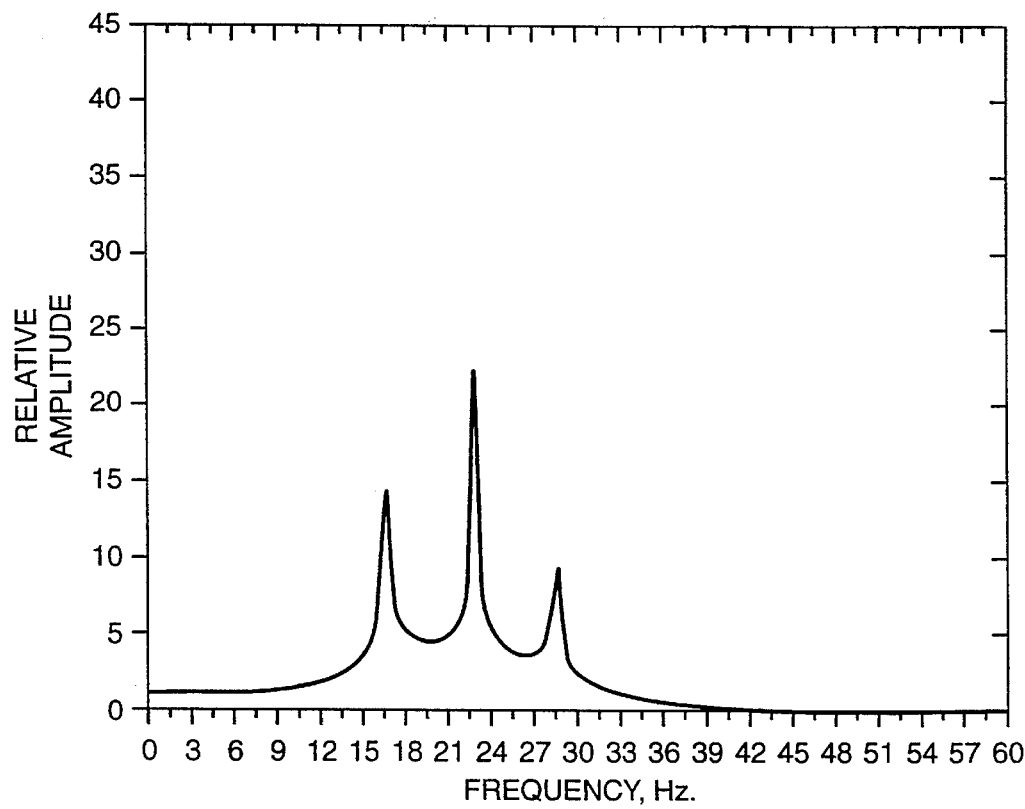
FIG._6

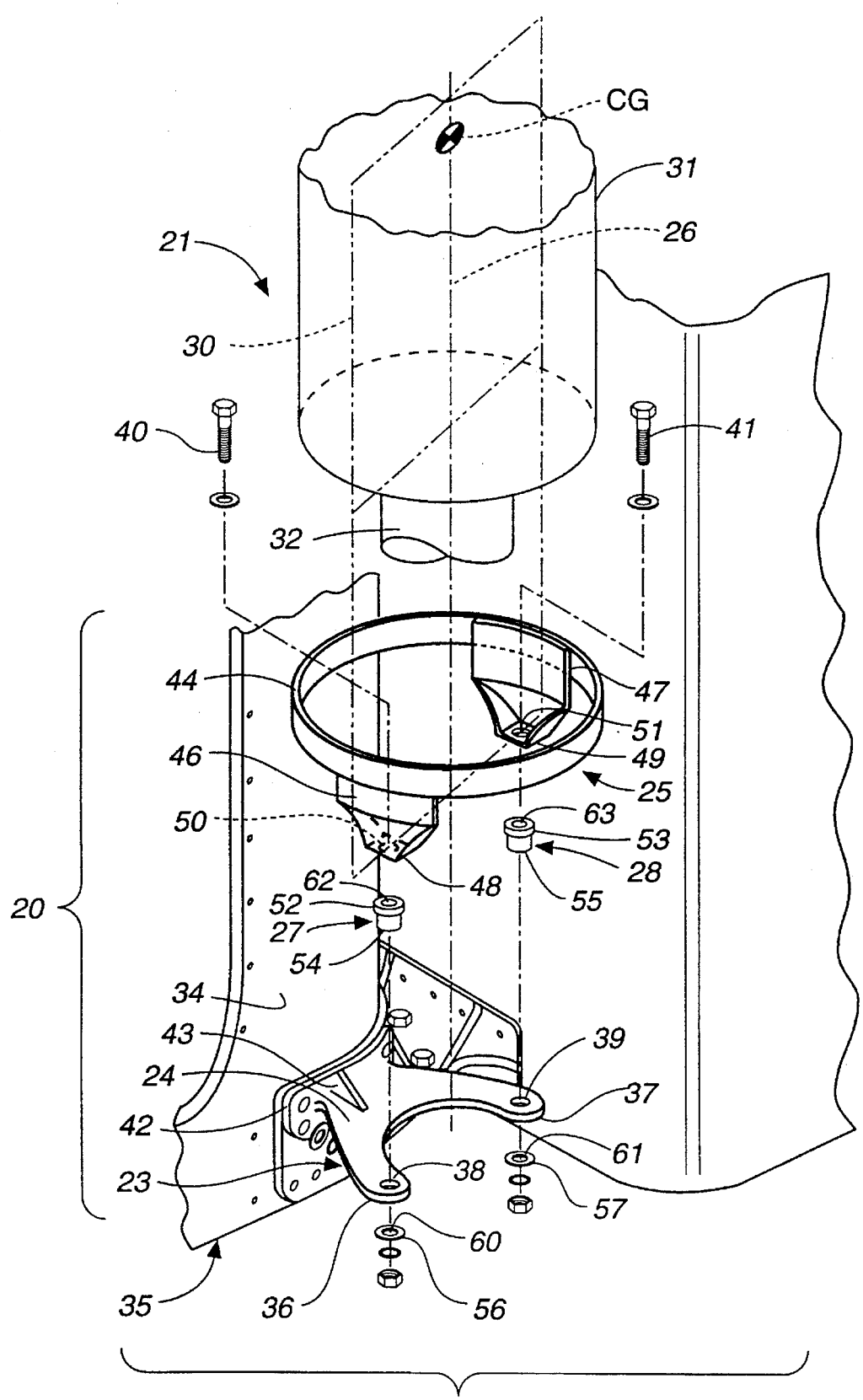
FIG._4

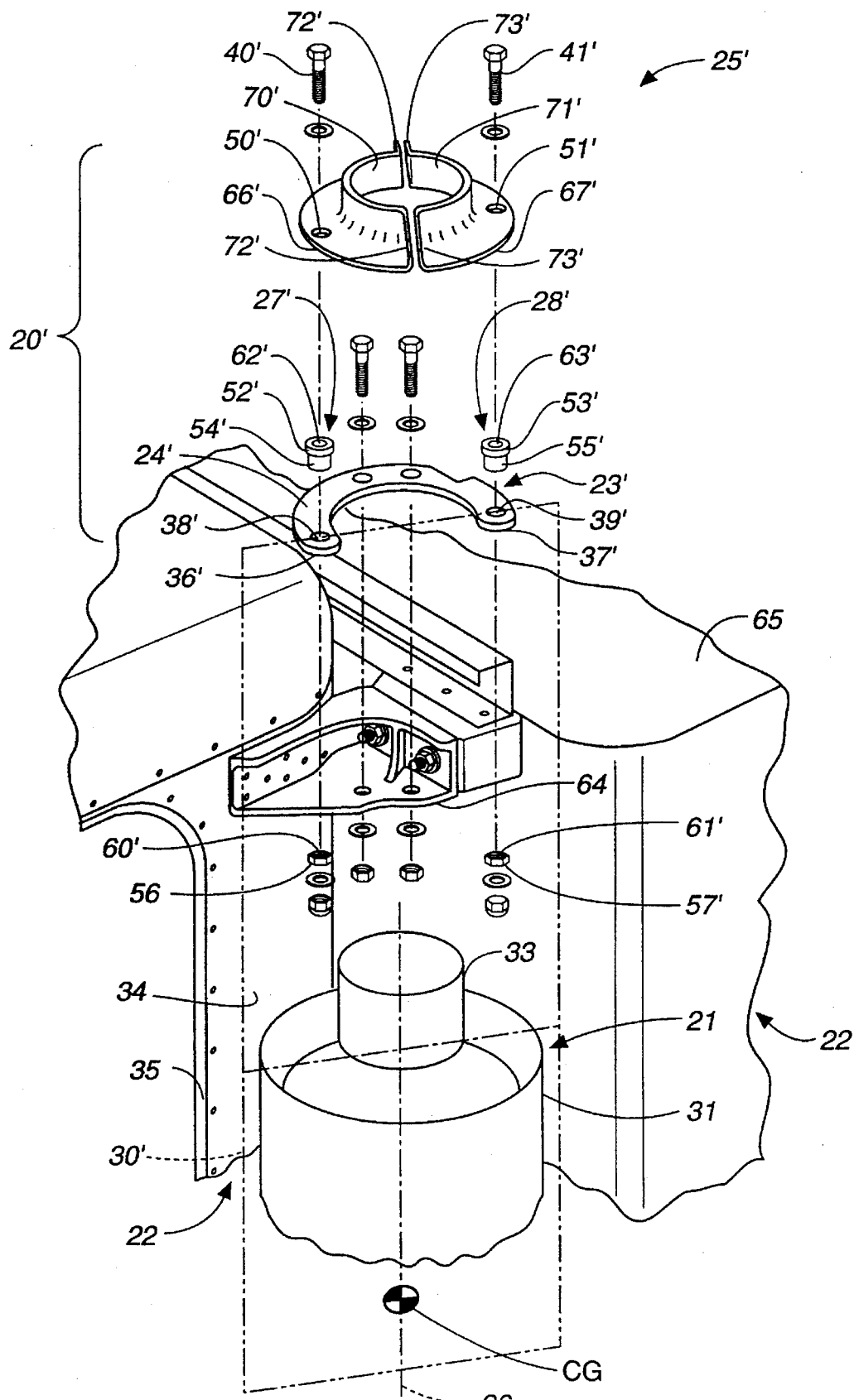
FIG._5

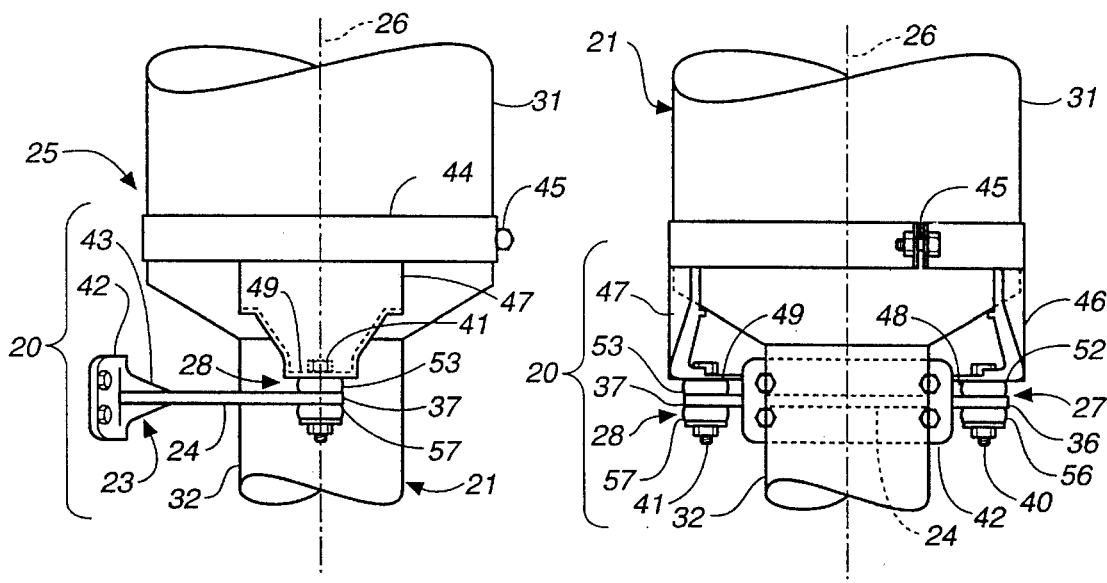
FIG._7  FIG._8
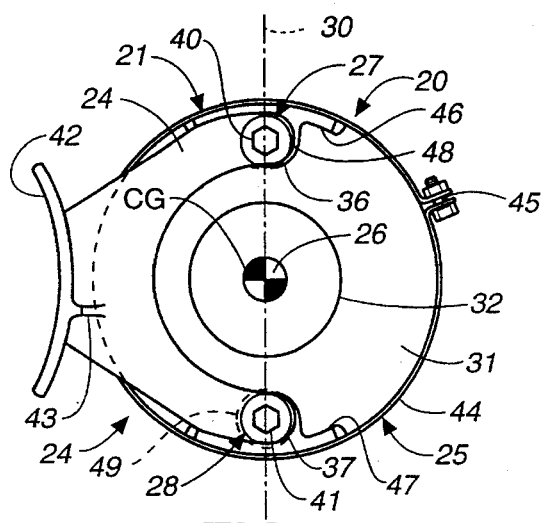
FIG._9

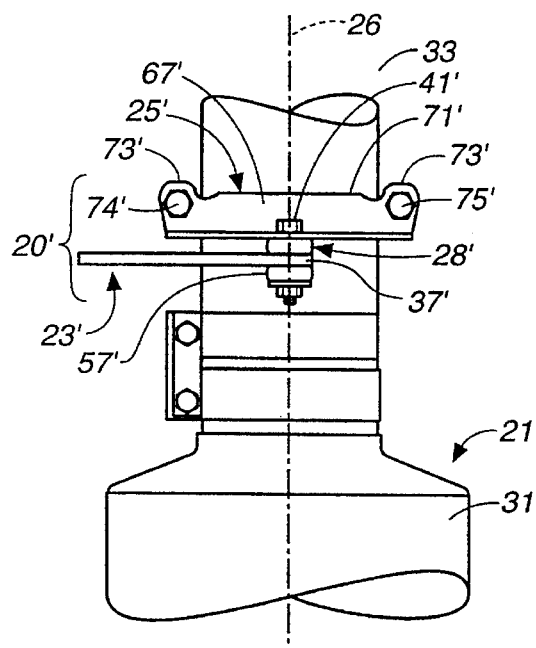
FIG._10
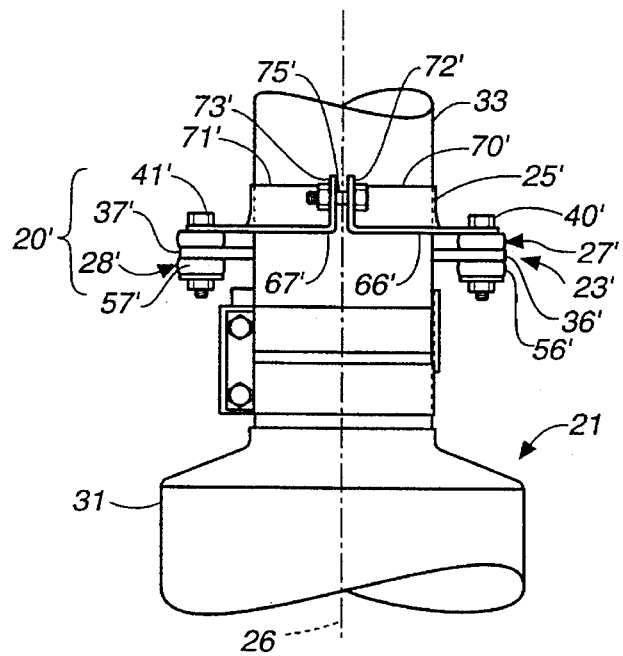
FIG._11
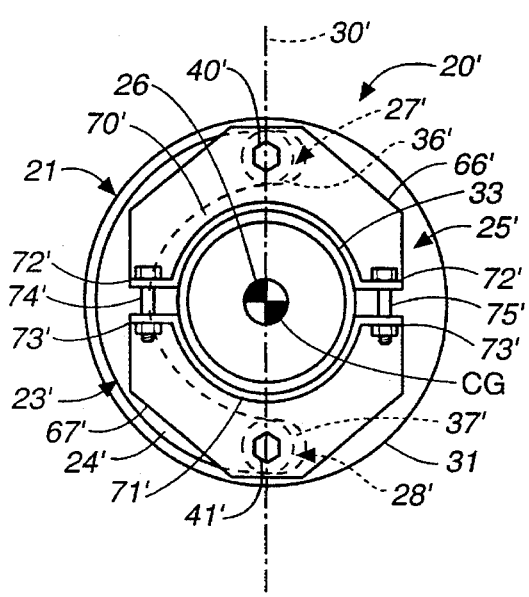
FIG._12

MUFFLER-TO-CAB ISOLATION MOUNTING ASSEMBLY AND METHOD FOR REDUCING CAB INTERIOR NOISE

TECHNICAL FIELD

The present invention relates, generally, to cab mounted muffler apparatus and, more particularly, to the isolation of muffler vibration from the cab structure.

BACKGROUND ART

Conventional class eight diesel trucks have muffler assemblies which are subject both to low-frequency vibration from the chassis, and higher-frequency vibration from the engine. The muffler assemblies are typically either horizontally mounted, rigidly affixed to the frame of the truck, or vertically mounted, affixed with some compliance to the truck cab or sleeper, or rigidly mounted to independent stanchions behind the cab or sleeper.

Cab-mounted vertical mufflers are very common on conventional trucks or tractors, especially those without sleepers. Such direct mounting of the muffler apparatus to the structure of the cab is disadvantageous in that the high-frequency vibration of the muffler caused by the pulsations in the exhaust gas are transmitted into the cab structure, where the skin of the cab vibrates and creates noise. This noise is an annoying and tiring low-frequency boom that can increase noise levels in the cab at the firing frequency of the engine by 10 decibels or more during acceleration or hard pulls up a grade.

Ideally, interior cab noise from structurally transmitted muffler vibration can be minimized by designing a muffler mounting assembly that isolates the cab from the vibrating muffler. Since the muffler has mass, the muffler will resonate (that is, exhibit a large-amplitude vibration from minimal input, or "amplify" the input) at a set of frequencies determined by the stiffness of the compliant members isolating the muffler from the cab, by the mass and inertia and center-of-gravity location of the muffler, and by the geometry of the mounts. The muffler motions at the resonant frequencies are called "mode shapes," or simply "modes." All these modal frequencies, the muffler will transmit vibration into the cab very efficiently.

If the parameters of the muffler mounting system are chosen to locate one or more of these modes at low frequencies, the muffler will be driven to large motions by the chassis' response to road roughness, or by the resonances of chassis components. Examples include sprung-mass rigid body modes between 1.5 and 5 Hz, frame beaming between 5 and 10 Hz, and axle hop modes between 9 and 13 Hz. The resulting large-amplitude motions of the muffler would be undesirable both because the mounts would build up heat and fail quickly, and because the muffler and associated flex systems would be subjected to high forces and the potential for mechanical failure. These "ride" phenomena typically lie below 13 Hz, as shown in FIG. 1, so the ideal muffler mounting system would have no resonant modes below 15 Hz.

An inline 6-cylinder 4-stroke diesel engine fires between 30 and 105 Hz. If the muffler mounting system parameters are adjusted to locate the muffler modes in this frequency range, the muffler will resonate at the engine's firing frequency, at which considerable pulsatile energy is present in the exhaust gas stream. This energy would be amplified by the muffler mounting system, and be transmitted efficiently to the cab structure, which would produce high-amplitude noise at that frequency inside the cab. This limitation establishes an upper bound for the acceptable target muffler mode frequency range. Note that current practice locates some of the muffler system modes above 31 Hz, and that many existing trucks with cab-mounted mufflers exhibit low frequency boom to some degree as a result.

This establishes a "target window" ranging from approximately 15 to 25 Hz, allowing for some safety margin on both ends of the window. If a muffler mounting system can be built with all relevant modes in the target window between 15 and 25 Hz, then the mounting system will not amplify ride vibration, and yet it will isolate the cab from higher-frequency vibration created by gas pulsations inside the muffler. However, designing a muffler mounting system that produces muffler modes in the target window is problematic and difficult. This difficulty arises because of the inertial properties of mufflers and geometric properties of typical mounting systems. These factors tend to produce too large a spread in muffler mode frequencies, so that if the highest mode is at 25 Hz, for instance, the lowest mode might be at 5 Hz, thus amplifying ride dynamics to an unacceptable degree. If stiffer mounts are used, so that the lowest muffler mode lies at 15 Hz, the highest mode might be located near 40 Hz, producing an unacceptable noise problem.

Current prior art mounting assemblies 10 (FIG. 2) typically include an upper mounting assembly 11 and a lower mounting assembly 11' each having a pair of bushings or springs 12, 12' formed for vibration isolation of the muffler apparatus 13 from the cab 14. Each mounting assembly includes a support bracket 15, 15', formed to strap to the inlet exhaust pipe (not shown) and the upper outlet exhaust pipe 16, respectively, and a mounting bracket 17, 17' rigidly coupled to the exterior skin of cab 14.

As mentioned above, at least two isolation bushings 12, 12' are required between the respective support brackets and mounting brackets for proper stability and vibration isolation therebetween. These bushings not only provide isolation, but varying the spring stiffness thereof also varies the natural resonance frequency modes of the mounting assembly itself.

One problem associated with this two-bushing arrangement is that it is difficult to select bushing spring rates or stiffnesses which cause the natural resonant frequencies of the muffler assembly to fall within the envelope defined by the above-mentioned "target window" (FIG. 1). Varying the spring rate not only causes the resonant frequencies to shift, but also causes the frequency spread between the resonant frequency modes to shift. Hence, finding the proper combination of frequency spread and placement of the resonant frequencies is difficult if not unattainable with the prior art mounting assemblies.

This effect is due in part to the physical arrangement and location of the bushings which determine the different vibrational degrees of freedom. As shown in the graph of FIG. 3, the standard mounting assembly resonant frequency modes (spikes in FIG. 3) are spread over a large frequency range, and lie within a major portion of the engine firing frequency. Accordingly, exciting a frequency mode of the mounting assembly, during operation of the truck, is almost assured. This ultimately causes muffler apparatus 13 to vibrate sufficiently so that the low frequency "booming" is detectable in the cab interior.

DISCLOSURE OF INVENTION

Accordingly, it is an object of the present invention to provide a muffler mounting and method which mounts a muffler apparatus to a cab of a vehicle.

Another object of the present invention is to provide a muffler mounting and method which reduces or isolates muffler vibration from the cab.

It is another object of the present invention to provide a muffler mounting and method which reduces low frequency resonance noise transmission from the muffler to the cab interior.

Still another object of the present invention to provide a muffler mounting and method which provides good mounting stability to the muffler.

It is a further object of the present invention to provide a muffler mounting and method which is durable, compact, easy to maintain, has a minimum number of components, is easy to use by unskilled personnel, and is economical to manufacture.

The present invention includes a muffler mounting assembly for mounting an elongated muffler to a vehicle for vibratory isolation thereof. The mounting assembly includes a mounting bracket formed for rigid coupling or mounting to the vehicle and having an end portion positioned proximate the muffler. A muffler support bracket is provided supportively contacting an exterior of the muffler about a longitudinal axis thereof. The present invention muffler mounting assembly further includes a pair of isolation mounting devices positioned between and coupling the support bracket to the end portion of the mounting bracket at locations substantially on opposite sides of the muffler. Each mounting device is further substantially aligned in a plane extending through a center of gravity of the muffler.

Each mounting device for a particular mounting assembly is preferably contained in the same horizontal plane, and is equidistant from the muffler apparatus longitudinal axis.

In another aspect of the present invention, a method is provided for reducing vibration transmission from a cab-mounted muffler apparatus to a cab of a vehicle through a muffler mounting assembly. The method, briefly, includes the steps of: rigidly mounting the mounting bracket to the vehicle cab, and rigidly supporting the muffler apparatus with a muffler support bracket through supportive contact with an exterior of the muffler apparatus. The support bracket contacts the muffler about a longitudinal axis thereof. The present invention further includes the step of positioning a pair of isolation mounting devices between and coupling the support bracket to the end portion of the mounting bracket. These mounting devices are at locations substantially on opposite sides of the muffler apparatus such that the mounting devices are substantially aligned in a plane extending through a center of gravity of the muffler apparatus.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a chart illustrating the resonant frequencies of the primary structural components of a class eight diesel vehicle.

FIG. 2 is a fragmentary, exploded, top perspective view, partially broken away, of a prior art muffler mounting assembly vertically mounting a muffler apparatus to a truck cab.

FIG. 3 is a graph of the resonant frequency modes of a commonly employed prior art muffler mounting assembly.

FIG. 4 is a fragmentary, exploded, top perspective view, partially broken away, of a lower muffler mounting assembly constructed in accordance with the present invention coupled to the periphery of the muffler.

FIG. 5 is a fragmentary, exploded, top perspective view, partially broken away, of an upper muffler mounting assembly constructed in accordance with the present invention coupled to the outlet exhaust pipe of the muffler.

FIG. 6 is a graph of the resonant frequency modes of the muffler mounting assembly of the present invention.

FIG. 7 is a fragmentary, front elevation view of the lower muffler mounting assembly of FIG. 4.

FIG. 8 is a fragmentary, side elevation view of the lower muffler mounting assembly of FIG. 7.

FIG. 9 is a fragmentary, bottom plan view of the lower muffler mounting assembly of FIG. 7.

FIG. 10 is a fragmentary, front elevation view of the upper muffler mounting assembly of FIG. 5.

FIG. 11 is a fragmentary, side elevation view of the upper muffler mounting assembly of FIG. 10.

FIG. 12 is a fragmentary, top plan view of the upper muffler mounting assembly of FIG. 10.

BEST MODE OF CARRYING OUT THE INVENTION

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Attention is now directed to FIGS. 4 and 5, where an lower and upper muffler mounting assembly, generally designated 20 and 20', respectively, are illustrated for mounting an elongated muffler apparatus 21 to a vehicle 22 for vibratory isolation thereof. Each mounting assembly 20, 20' includes a mounting bracket, generally designated 23, 23', formed for mounting to vehicle 22 and having an end portion 24, 24' positioned proximate muffler apparatus 21. A muffler support bracket, generally designated 25, 25', is provided supportively contacting an exterior surface of muffler apparatus 21, and is dimensioned to extend substantially around a longitudinal axis 26 thereof. Each muffler mounting assembly 20, 20' includes a pair of isolation mounting devices 27, 28 and 27', 28' which couple support bracket 25, 25' to end portion 24, 24' of mounting bracket 23, 23'. Each mounting device is positioned at a location between the support bracket and the mounting bracket, and at substantially opposite sides of the muffler longitudinal axis 26. Further, each mounting device 27, 28 and 27', 28' is substantially aligned in a plane 30, 30' substantially containing the center of gravity (hereinafter "CG") of muffler apparatus 21.

Accordingly, a muffler mounting assembly is provided which advantageously positions the mounting devices between the support bracket and the mounting bracket on opposite sides of the muffler longitudinal axis, and which are aligned in a plane extending through the CG of the muffler apparatus. As will be discussed in greater detail, this arrangement has significantly and effectively reduced low frequency boom noise audibly detectable from the cab interior which is caused by transmission of the resonance of the muffler apparatus.

Since the mass of the various muffler assemblies is relatively constant, the location and spring rates of the mounts have a profound effect in the determination of the natural (resonant) frequencies. By positioning the resilient mounting devices strategically on opposite sides of the muffler apparatus and substantially aligned in the plane passing through the center of gravity of the muffler apparatus, one of the primary modes of vibration (i.e., fore and aft or lateral, depending on the mounting location relative to the cab) can be significantly reduced or eliminated. In turn, the frequency spread between the resonant frequency modes can be significantly reduced (FIG. 6) as compared to the prior art isolation bushings of the muffler mounting assembly (FIG. 3).

Accordingly, the mounting device spring rates can be more easily selected or tuned to manipulate the resonant frequency modes of the present muffler mounting assembly 20, 20' to fall within the "target window" resonant frequency envelope.

In the preferred form, the mounting devices are preferably provided by resilient bushings having a spring rate of about 800 lb/in; while the spring rates for the lower isolation bushings 27, 28 are preferably about 800 lb/in. Moreover, bushings 27, 28 and 27', 28' are preferably composed of rubber or other elastomeric compound. It will be appreciated, however, that the bushings could be composed of silicon or polyurethane or a combination thereof. Further, the bushing may be provided by a steel spring or air bladder or the like without departing from the true spirit and nature of the present invention.

It will be understood that muffler apparatus 21 is generally provided by muffler device 31 having an inlet exhaust pipe portion 32 (FIG. 4), and an outlet exhaust pipe portion 33 (FIG. 5). Hence, the CG of muffler apparatus is generally the center of gravity of the muffler device 31.

TABLE I

A PETERBILT ® 379 "Big Window" Unibilt Daycab
(Cat 3406E, 435 hp)

| MUFFLER MOUNTS | 35 MPH dB (A) | 55 MPH dB (A) | HILL dB (A) | RUNUP dB (A) | IDLE dB (A) |
|---|---|---|---|---|---|
| Standard Prior Art Mounting Assembly: | 76.62 | 81.98 | 83.68 | 84.48 | 67.10 |
| Present Invention | 76.08 | 78.01 | 79.44 | 80.97 | 63.64 |
| Mounting Assembly: Change | −0.54 | −3.97 | −4.24 | −3.51 | −3.46 |

TABLE II

A PETERBILT ® 379 "Long Nose" Tractor
(DDC S60, 470 hp)

| MUFFLER MOUNTS | 35 MPH dB (A) | 55 MPH dB (A) | HILL dB (A) | RUNUP dB (B) | IDLE dB (A) |
|---|---|---|---|---|---|
| Standard Prior Art Mounting Assembly: | 75.05 | 80.93 | 81.35 | 84.52 | 63.03 |
| Present Invention | 72.60 | 76.25 | 81.82 | 81.23 | 61.48 |
| Mounting Assembly: Change | −2.45 | −4.68 | 0.47 | −3.29 | −1.55 |

As provided in TABLES I and II above, the sound pressure level (SPL) in a cab interior of a vehicle, having a vertically mounted muffler apparatus, is significantly reduced when the vehicle employs the present invention muffler mounting assembly (as compared to the same vehicle incorporating the standard prior art muffler mounting assembly). The class eight diesel truck employed in TABLE I was a PETERBILT® 379 "Big Window" Unibilt Daycab (Cat 3406E, 435 hp), while the diesel truck used in TABLE II was a PETERBILT® 379 "Long Nose" Tractor (DDC S60, 470 hp). These sound pressure level (SPL) measurements were conducted under different operational environments to illustrate the significant noise reductions over a broad operation range.

In most instances, at least a −3.0 dB(A) to a −4.5 dB(A) noise level reduction was measured. These reductions are quite significant considering an A-weighted scale downplays the importance of low frequency changes, and that a six (6) decibel gain is a doubling of the sound pressure. Moreover, the largest noise reductions (i.e., −4.0 dB(A) for the "Daycab" and −4.7 dB(A) for the "Tractor"), caused by transmission of the muffler apparatus resonance, occurred at 55 mph which of course is maximum speed limit of many highways and interstate freeways.

Referring now to FIGS. 4 and 7–9, lower mounting assembly 20 includes a Y-shaped mounting bracket 23 formed and dimensioned for rigid mounting to the exterior skin 34 of cab 35. The end portion 24 of mounting bracket 23 is preferably semi-circular for positioning about the muffler longitudinal axis 26. Preferably, the semi-circular end portion 24 includes two opposing finger portions 36, 37 dimensioned to circumferentially extend about muffler apparatus inlet pipe 32, although the finger portions could conceivably be dimensioned to circumferentially extend around muffler device 31.

End portion 24 is preferably flat having a pair of bushing receiving apertures 38, 39 at the ends of opposing finger portions 36, 37 for receipt and alignment of bushings 27, 28 and mounting bolts 40, 41 in plane 30 passing through the muffler apparatus CG. Coupled to the end portion of mounting bracket 23 is a flange portion 42 adapted to releasably mount mounting bracket 23 to the cab exterior skin 34 or other existing bracketry. Support ribs 43 may be provided between flange portion 42 and end portion 24 for additional stability (FIGS. 7 and 9).

As shown in FIGS. 7–9, support bracket 25 is preferably provided by a metallic band or strap member 44 circumferentially extending around and peripherally contacting muffler device 31 for stable coupling thereto. Support bracket 25 preferably includes an adjustment screw 45 (FIG. 9) which cooperates with strap member 43 for circumferential tightening to the muffler device.

A pair of opposed leg portions 46, 47 extend downwardly from strap member 43 toward mounting bracket finger portions 36, 37 for coupling thereto. Each leg portion 46, 47 includes a foot 48, 49, respectively, having bolt receiving holes 50, 51 therethrough which are vertically aligned with bushing receiving apertures 38, 39.

Mounting bolts 40, 41, are included which extend through receiving holes 50, 51, bushings 27, 28 and receiving apertures 38, 39, respectively, to releasably couple support bracket 25 to mounting bracket 23. FIG. 4 further illustrates that the mounting bracket finger portions, the support bracket foot portions and the isolation bushings are oppositely aligned about muffler apparatus longitudinal axis 26, and are positioned in the same plane 30 which contains the muffler apparatus CG therein.

Each mounting device or bushing 27, 28 includes a head portion 52, 53 and a sleeve portion 54, 55. Sleeve portion 54, 55 is formed and dimensioned for sliding receipt in respective bushing receiving apertures 38, 39, while the corresponding head portions are formed for seating against the finger portions 36, 37. A resilient washer 56, 57 seats against the other side of finger portions 36, 37, and includes a bore 60, 61 formed and dimensioned for sliding receipt of the corresponding sleeve portion 54, 55 therethrough.

The mounting bolts 40, 41 extend through passages 62, 63 (FIG. 4) in the mounting devices or bushings 27, 28 to releasably couple support bracket 25 to mounting bracket 23. Hence, this arrangement isolates contact between the feet 48, 49 and the corresponding finger portions 36, 37.

FIGS. 8 and 9 best illustrate that bushings 27, 28 are preferably substantially equidistant from the longitudinal axis 26 which preferably also passes through the muffler apparatus CG. Further, the bushings are preferably situated in substantially the same horizontal plane (not shown) which is perpendicular to vertical plane 30.

It will be appreciated, however, that in the broadest application of the present invention, the isolation bushings need only be situated substantially in the same vertical plane 30 containing the muffler apparatus CG. Accordingly, the bushings do not necessarily need to be in the same horizontal plane as one another nor need they be equidistant from the longitudinal axis 26, relative one another.

Turning now to FIGS. 5 and 10–12, upper mounting assembly 20' will be described which similarly includes a semi-circular mounting bracket 23' formed and dimensioned for rigid mounting to the exterior skin 34 of cab 35. In the embodiment shown in FIG. 5, mounting bracket 23' is preferably rigidly mounted to an existing upper bracket 64 coupling the cab 35 to a sleeper portion 65 of the vehicle. It will be understood, however, that upper mounting bracket 23' could be easily configured to releasably mount directly to exterior skin 34 of cab 35 similar to that of the lower mounting bracket 23 of lower mounting assembly 20.

The end portion 24' of upper mounting bracket 23' includes opposing finger portions 36', 37' circumferential positioned about the muffler longitudinal axis 26, and preferably dimensioned to receive outlet pipe 33 of the muffler assembly between the finger portions. It is conceivably, however, that mounting bracket 23' could be dimensioned to circumferentially receive the muffler device 31 itself.

Semi-circular mounting bracket 23' is preferably flat having a pair of bushing receiving apertures 38', 39' at the ends of finger portions 36', 37' for receipt of bushings sleeve portions 54', 55' therein, and substantially in alignment in plane 30' containing the muffler apparatus CG. Incidently, mounting devices or bushing 27', 28' are preferably substantially similar in shape to bushings 27, 28 employed in the lower mounting assembly 20 including head portions 52', 53'.

FIGS. 5 and 12 best illustrate that upper support bracket 25' for upper mounting assembly 20' is preferably provided by two opposing semi-circular members 66', 67' cooperating to releasably grasp outlet pipe 33 therebetween Each semi-circular member 66', 67' includes a lip portion 70', 71' formed to circumferentially grip muffler outlet pipe 33. Each lip portion 70', 71' includes a pair of opposing lip flanges 72', 73' which cooperate with clamping bolts 74', 75' (FIG. 12) to tighten lip portions 70', 71' around outlet pipe 33.

The semi-circular members 66', 67' each include bolt receiving holes 50', 51' therethrough which are aligned with bushing receiving apertures 38', 39'. Similarly, mounting bolts 40', 41', are included to extend through holes 50', 51', bushing 27', 28' and receiving apertures 38', 39' to releasably couple support bracket 25' to mounting bracket 23'. FIG. 5 further illustrates that the mounting bracket finger portions, the bolt receiving holes and the isolation bushings are oppositely aligned about muffler apparatus longitudinal axis 26, and are positioned in the same plane 30' which contains the muffler apparatus CG therein.

Again, it will be appreciated that in the broadest application of the present invention, the isolation bushings need only be situated substantially in the same vertical plane 30' containing the muffler apparatus CG. Accordingly, the bushings themselves do not necessarily need to be in the same horizontal plane nor need they be equidistant from the longitudinal axis 26 to realize the benefits of the present invention.

In the preferred form, the vertical plane 30 containing lower isolation bushings 27, 28 is substantially the same or co-planar with the vertical plane 30' containing upper isolation bushing 27', 28'. The two planes containing the muffler apparatus CG, however, need not be co-planar to practice the vibration isolation benefits provided by the present invention.

Moreover, it will be understood that while support bracket 25' of upper mounting assembly 20' preferably mounts to outlet pipe 33 of muffler apparatus 21, and support bracket 25 of lower mounting assembly 20 preferably mounts to muffler device 31 itself, the two mounting arrangements may be interchanged without departing from the true spirit and nature of the present invention.

As is apparent from the description of the present invention, a method is provided for reducing vibration transmission from a cab-mounted muffler apparatus 21 to a cab 35 of a vehicle 22 through a muffler mounting assembly 20. The method, briefly, includes the steps of: rigidly mounting bracket 23 to vehicle cab 35, and rigidly supporting muffler apparatus 21 with a muffler support bracket 25 through supportive contact with an exterior of the muffler apparatus 21. The support bracket contacts muffler apparatus 21 about a longitudinal axis 26 thereof. The present invention further includes the step of positioning a pair of isolation mounting devices 27, 28 between and coupling support bracket 25 to the end portion 24 of mounting bracket 23. These mounting devices 27, 28 are at locations substantially on opposite sides of muffler apparatus 21 such that the mounting devices are substantially aligned in a plane 30 containing the center of gravity of muffler apparatus 21.

What is claimed is:

1. A muffler apparatus and mounting assembly for mounting said muffler apparatus to a vehicle for vibratory isolation thereof comprising:

a muffler apparatus;

a mounting bracket formed for rigid coupling to said vehicle and having an end portion positioned proximate said muffler apparatus;

a muffler support bracket supportively contacting an exterior of said muffler apparatus about a longitudinal axis thereof; and a pair of isolation mounting devices positioned between and coupling said support bracket to the end portion of said mounting bracket at locations substantially on opposite sides of the muffler apparatus such that the mounting devices are substantially aligned in a plane containing a center of gravity of said muffler apparatus.

2. The muffler mounting assembly as defined in claim 1 wherein, said mounting devices each include a resilient bushing positioned between the mounting bracket end portion and said support bracket for isolation therebetween.

3. The muffler mounting assembly as defined in claim 2 wherein, each said bushing is selected of a spring rate 800 lb/in.

4. The muffler mounting assembly as defined in claim 3 wherein, each said bushing is composed of rubber.

5. The muffler mounting assembly as defined in claim 2 wherein, each said bushing includes a sleeve portion, and said end portion includes a pair of apertures extending therethrough each formed and dimensioned for sliding receipt of one said sleeve portion.

6. The muffler mounting assembly as defined in claim 5 wherein, each said bushing includes a head portion having a transverse cross-sectional dimension larger than one said aperture for seating against one side of said end portion, and a resilient washer portion seated against the other side of said end portion and defining a bore formed and dimensioned for sliding receipt of a sleeve portion therethrough.

7. The muffler mounting assembly as defined in claim 6 wherein, each said mounting device further includes a mounting bolt extending through a passage in said head portion and said sleeve portion to releasably couple said support bracket to said mounting bracket.

8. The muffler mounting assembly as defined in claim 1 wherein, said end portion includes one finger extending around one side of said longitudinal axis, and a second finger extending around an opposite side of said longitudinal axis.

9. The muffler mounting assembly as defined in claim 8 wherein, said mounting bracket is Y-shaped.

10. The muffler mounting assembly as defined in claim 1 wherein, said support bracket includes a strap member substantially contacting and extending around a periphery of a muffler device of said muffler apparatus.

11. The muffler mounting assembly as defined in claim 10 wherein, said support bracket further includes a pair of leg portions extending away from said strap member toward said mounting bracket end portion for coupling thereto.

12. The muffler mounting assembly as defined in claim 1 wherein, said support bracket is formed to releasably grip an exhaust pipe portion of said muffler assembly extending into and communicating with a muffler device thereof, and having a transverse cross-sectional dimension smaller than a transverse cross-sectional dimension of said muffler device.

13. The muffler mounting assembly as defined in claim 12 wherein, said support bracket comprises two opposing semi-circular members each formed for circumferentially extending about and contacting an exterior surface of said exhaust pipe portion.

14. The muffler mounting assembly as defined in claim 1 wherein, said plane is a substantially vertical plane extending through said longitudinal axis and said center of gravity.

15. The muffler mounting assembly as defined in claim 14 wherein, said mounting devices are both substantially contained in a horizontal plane intersecting said vertical plane.

16. The muffler mounting assembly as defined in claim 14 wherein, said mounting devices are equidistant from said longitudinal axis, relative one another.

17. The muffler mounting assembly as defined in claim 1 wherein, the first named muffler mounting assembly is positioned proximate a lower portion of said muffler apparatus, and further including a second muffler mounting assembly comprising:

a second mounting bracket formed for rigid coupling to said vehicle and having an end portion positioned proximate an upper portion of said muffler apparatus;

a second muffler support bracket supportively contacting an exterior of said muffler apparatus about a longitudinal axis thereof; and a second pair of isolation mounting devices positioned between and coupling said second support bracket to the end portion of said second mounting bracket at locations substantially on opposite sides of the muffler apparatus such that the second mounting devices are substantially aligned in a second plane containing said center of gravity of said muffler apparatus.

18. The muffler mounting assembly as defined in claim 17 wherein, the first named plane of said first named mounting assembly is substantially co-planar with said second plane of said second mounting assembly.

19. The muffler mounting assembly as defined in claim 18 wherein, said first named plane and said second plane are substantially vertical and extend through both said longitudinal axis and said center of gravity.

20. The muffler mounting assembly as defined in claim 19 wherein, said mounting devices of said first named mounting assembly are both substantially contained in a first horizontal plane intersecting said first named plane, and said second mounting devices of said second mounting assembly are both substantially contained in a second horizontal plane intersecting said second plane.

21. The muffler mounting assembly as defined in claim 19 wherein, said first named mounting devices are equidistant from said longitudinal axis, relative one another, and said second mounting devices are equidistant from said longitudinal axis, relative one another.

22. The muffler mounting assembly as defined in claim 17 wherein, the first named support bracket of said first named mounting assembly is formed to releasably grip an outlet exhaust pipe portion of said muffler assembly extending out of and communicating with a muffler device thereof; and said second support bracket of said second mounting assembly includes a strap member substantially contacting and extending around a periphery of said muffler device of said muffler apparatus.

23. A method of reducing vibration transmission from a cab-mounted muffler apparatus to a cab of a vehicle through a muffler mounting assembly comprising the steps of:

rigidly mounting a mounting bracket to a vehicle cab, the mounting bracket having an end portion positioned proximate said muffler apparatus;

rigidly supporting said muffler apparatus with a muffler support bracket through supportive contact with an exterior of said muffler apparatus, and about a longitudinal axis thereof; and positioning a pair of isolation mounting devices between and coupling said support bracket to the end portion of said mounting bracket at locations substantially on opposite sides of the muffler apparatus such that said mounting devices are substantially aligned in a plane containing a center of gravity of said muffler apparatus.

* * * * *